Oct. 29, 1968 L. P. HALLEE ETAL 3,407,789
HEATING APPARATUS AND PROCESS
Filed June 13, 1966 5 Sheets-Sheet 1

INVENTORS
HERMAN N. WOEBCKE
LAWRENCE P. HALLEE
ELLIS J. GREEN

Morgan, Finnegan, Durham & Pine
ATTORNEYS

Oct. 29, 1968  L. P. HALLEE ETAL  3,407,789
HEATING APPARATUS AND PROCESS
Filed June 13, 1966  5 Sheets-Sheet 3
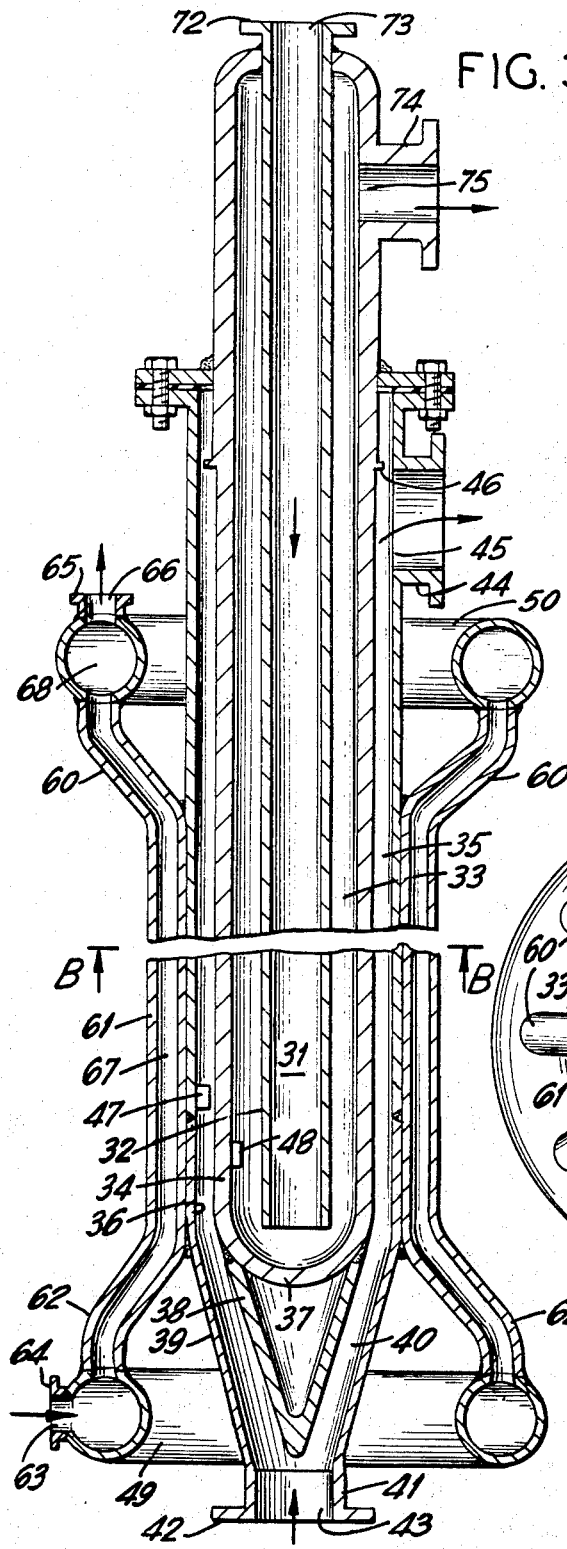
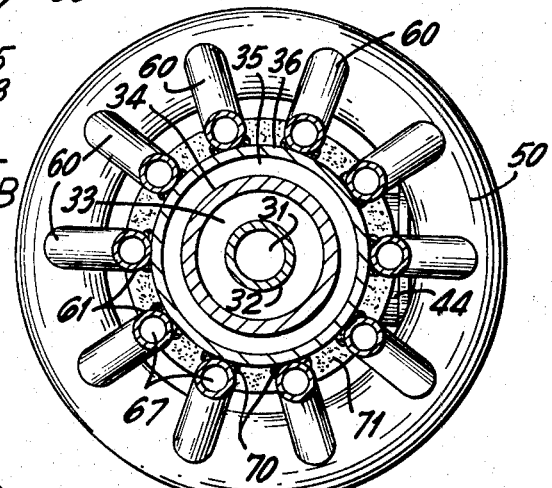
INVENTORS
HERMAN N. WOEBCKE
LAWRENCE P. HALLEE
ELLIS J. GREEN
Morgan, Finnegan, Durham & Pine
ATTORNEYS

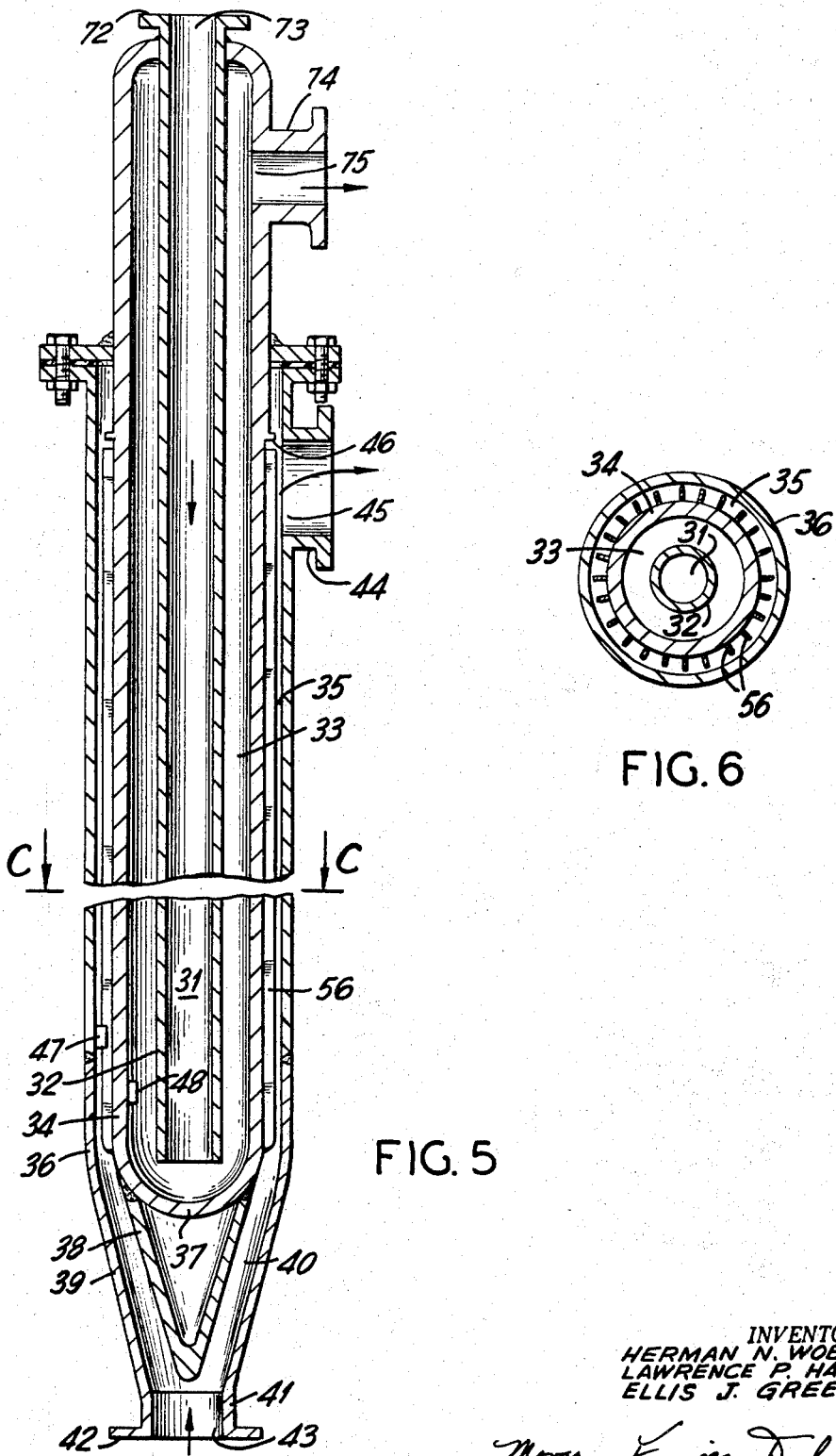

United States Patent Office 3,407,789
Patented Oct. 29, 1968

3,407,789
HEATING APPARATUS AND PROCESS
Lawrence P. Hallee, Wimbledon Common, England, and
Ellis J. Green, Winchester, and Herman N. Woebcke,
Lexington, Mass., assignors to Stone & Webster Engineering Corporation, Boston, Mass., a corporation of
Massachusetts
Filed June 13, 1966, Ser. No. 557,007
21 Claims. (Cl. 122—356)

The present invention relates to a process for heating a fluid in a conduit and to apparatus for heating the fluid as it passes through the conduit.

The invention relates to a process and apparatus for heating a fluid to high temperature, and maintaining it at high temperature for a short time.

The invention particularly relates to carrying out hydrocarbon conversion processes which comprise heating the hydrocarbon to high temperature, maintaining it at high temperature for a short reaction time and at a low partial pressure and rapidly cooling the hydrocarbon to a temperature below which the conversion is carried out.

The invention specifically relates to a process for the thermal cracking of hydrocarbons which process comprises high temperature thermal cracking for a short residence time while maintaining a low hydrocarbon partial pressure and a relatively high mass velocity.

The process of the present invention utilizes a novel high temperature reaction furnace containing relatively short conduits of small diameter for the fluid to be heated.

The furnace of the present invention comprises means whereby hydrocarbon feed may be heated to an elevated reaction temperature and maintained at said reaction temperature for a short time while the desired chemical reaction is carried out and the feed is selectively converted to the desired product or products.

The invention is particularly directed to using a furnace containing a multiplicity of radiant heat burners on at least the walls of the furnace whereby substantially all of the heat is provided to fluid-containing conduits by radiation. The conduits in the furnace are of relatively short length and small diameter.

A particular purpose for which the process and apparatus of the present invention can be used is to carry out hydrocarbon pyrolysis under conditions of short residence time, high temperature and low hydrocarbon partial pressure which are selective to high olefin production, particularly of ethylene, and high ratios of olefin yield to saturates yield e.g., $H_2$, $CH_4$, $C_2H_6$, etc. The process and apparatus of this invention can achieve high ethylene yields from a wide range of hydrocarbon feeds including ethane and crude oil.

Most conventional hydrocarbon cracking furnaces utilize long conduits of relatively large diameter for the fluids being heated, resulting in long residence time and high pressure drop in the conduit.

Conventional tubular furnaces used for cracking hydrocarbons to produce olefins, though workable, have not achieved maximum yields of olefins at high selectivity. The conventional furnaces have long conduits which exhibit high pressure drop; the resulting high pressure adversely affects the selectivity to the desired products.

Cracking furnace effluent gas temperatures are very high, and at these high temperatures the cracking reactions proceed at a rapid rate. In order to substantially stop the reactions in the effluent gas and to minimize the production of undesirable by products, it is necessary to rapidly cool the effluent gas after it leaves the reactor to a temperature at which the reactions substantially cease.

The present invention relates to novel apparatus and a novel process for the treatment of fluids at elevated temperatures. In utilizing the apparatus of the present invention, a fluid, e.g. hydrocarbons, can be heated at elevated temperatures for a short residence time while maintaining a low reactant partial pressure and relatively high mass velocity in the reaction zone, and effecting a low pressure drop through the reaction zone. In accordance with the present invention, hydrocarbon feed can be heated to high temperature, maintained at high temperature for a short residence time and selectively converted to desired products. The process also includes a rapid quench or cooling step for the hot gas reaction products which cooling is carried out in such a manner that the conversion is substantially stopped after the desired residence time. A particular use for the process described herein is in the high temperature cracking of hydrocarbons to produce olefins, ethylene in particular, and other unsaturated hydrocarbons.

The furnace of the present invention may be used for any desired heating service and in particular for carrying out chemical conversion reactions wihch require high temperature, short residence time and relatively high mass velocity. A particular use for the novel furnace of the present invention is in carrying out high temperature cracking using hydrocarbon feed. The feed or material to be heated is contained within conduits or tubes in the furnace and the tubes are heated by radiant heat. To obtain the heating of the tubes necessary to carry out the present invention, a multiplicity of radiant heat burners are positioned on the walls of the furnace. By utilizing a plurality of radiant heat burners, accurate and close control of the heat may be obtained by simple adjustment of the fuel input to the radiant burners.

The furnace of the present invention comprises a convection preheat zone and a radiant conversion zone or cracking zone. In the radiant section the conduits or tubes in which the fluid to be treated is contained are relatively short, of small diameter and of low pressure drop design. The specific operating conditions of the furnace are dependent on the characteristics of the feed stock and the desired products. The length and inside diameter of the conduits or coils in the radiant section are selected to provide the desired residence time and pressure drop. The coils can be disposed vertically or horizontally within the fire box, with two or more tubes connected in series by bends to form a coil. Two or more or such coils can form a coil assembly. The tubes are disposed in the furnace in a plane or planes generally parallel to two facing sides of the fire box, in which sides a plurality of burners is located. Each coil assembly can have its own convection preheat zone and its own quenching or cooling zone.

The quenching zone is close coupled to the reaction products outlet from the furnace and provides rapid cooling of the effluent from the reaction temperature down to a temperature at which the reaction is substantially stopped. The thus cooled effluent can be cooled further by conventional heat exchange means.

The quenching apparatus and process of cooling of the present invention represent an important part of the overall process. However, the concept used can be readily applied to other processes for cooling hot product streams, for heat recovery and/or for heating fluids. The cooling means and process can be used for rapidly cooling hot gaseous products from other cracking processes. The quenching apparatus provides direct cooling on surfaces. The apparatus is simple in design and easy to operate. The apparatus can be of any size and is normally designed for a specified service. The apparatus can be horizontally or vertically disposed. The cooling unit rapidly cools hot fluids while not substantially changing the pressure of the fluid. That is, the pressure of the cooled fluid at the outlet of the cooling unit is substantially the same as the inlet pressure. The material to be cooled can be upflow or downflow. The operation of the unit can be such that the coolant circulation rate can be self-regulating and within limits adjust itself to the heat load. Alternatively, the coolant circulation rate can be controlled by suitable auxiliary pumping means.

In an embodiment of the invention the coolant apparatus consists essentially of three concentric pipes, the walls of which form two annular chambers and one central chamber. The cooling fluid can be fed into the top of the unit and flow into the central chamber. The central chamber at the end opposite its inlet is in communication with the first annular chamber. The cooling fluid can flow downward in the central chamber and upward in the first annular chamber and exit through an opening at or near the top of the first annular chamber. The outer wall of the second concentric pipe forms a cooling surface. The hot gaseous material to be cooled can enter at the bottom of the cooling device through an opening in the third concentric pipe and pass upward through the second annular chamber and be cooled by direct contact with the cooling surface. The cooled material can pass out of the cooling device through an outlet located near the top of the second annular chamber.

The furnace described can be used for other processes than for cracking of hydrocarbons to olefins. Other quenching means than the described means can be used. Though the quenching means have specific application to rapid cooling of hot effluent gas from hydrocarbon cracking furnaces, the cooling means can, of course, be used for other types of cooling service. The cooling means described herein, however, are preferred for rapidly cooling the hot reaction product gases of the present invention.

The invention will be better understood and made more apparent when considered in conjunction with the accompanying drawings wherein:

FIGURE 3 is a side elevation of an embodiment of the cooling or quench apparatus.

FIGURE 4 is a section of the cooling apparatus of FIGURE 3 taken through B—B showing a cross section of the concentric pipes and cooling tubes.

FIGURE 5 is a side elevation of another embodiment of the cooling apparatus.

FIGURE 6 is a section of the cooling apparatus of FIGURE 5 taken through C—C showing the concentric pipes and cooling fins.

Figure 1:
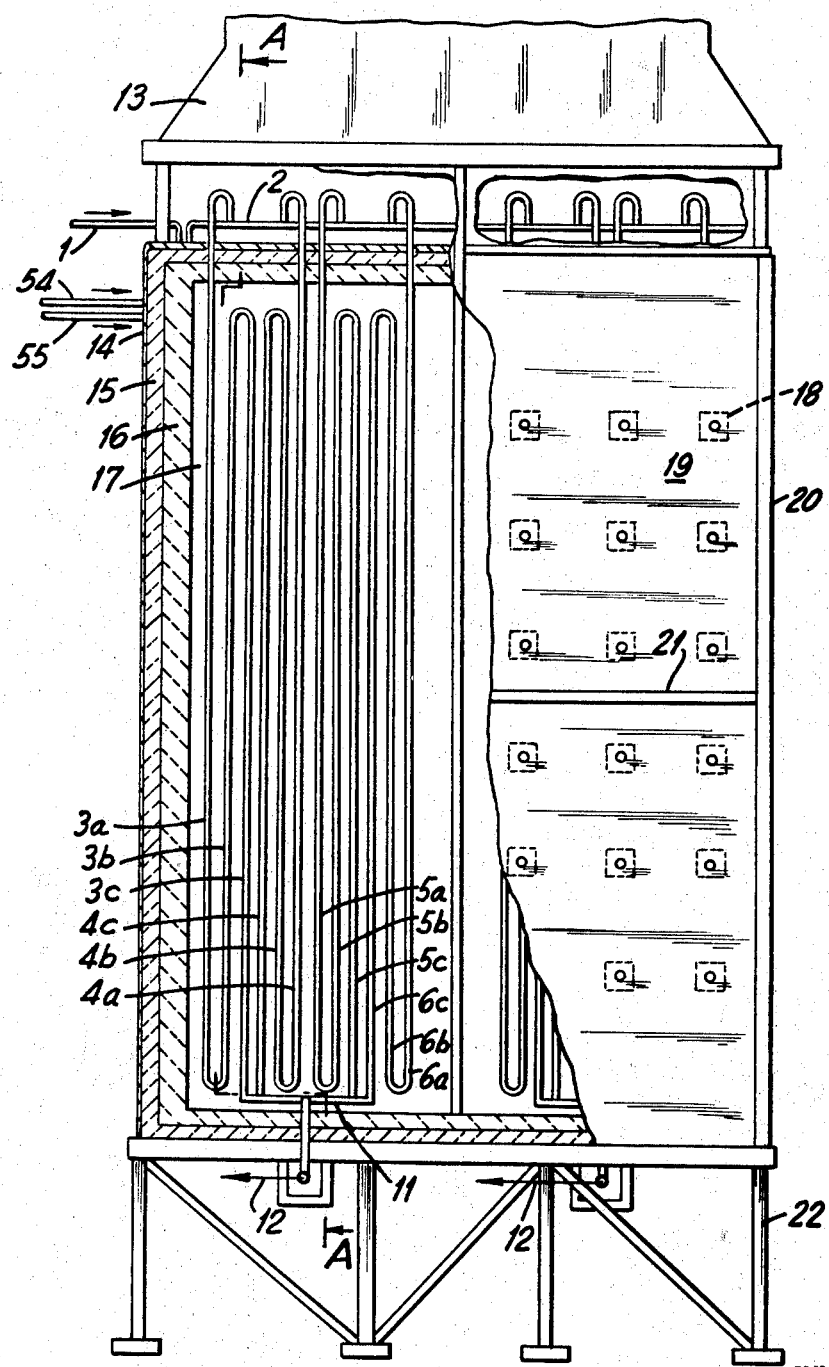
FIGURE 1 is a side elevation of a heating furnace apparatus constructed in accordance with the present invention with part of the side wall broken away to show the inside construction of the furnace.

The process and apparatus of the present invention may use as a feed a material selected to produce specific specialty chemical products.

Suitable feed stocks are hydrocarbons which are heated to thermally crack the hydrocarbons. Feeds that can be processed include ethane, propylene, propane, butane, pentane, and mixtures of the foregoing, naphtha, gas oil, and crude oil.

A particular use of the process and apparatus is to crack petroleum fractions boiling in the range of 80° F. to 750° F. to produce olefins.

Preferred feeds are petroleum naphtha fractions having initial boiling points in the range of 90° F. to 150° F. and final boiling points in the range of 220° F. to 400° F. The feed is cracked selectively to produce olefins, particularly ethylene, in high yield.

In the thermal cracking of hydrocarbons to produce olefins, steam is usually added to the feed. The cooling apparatus can use any desired cooling fluid. The cooling fluid can be a liquid that, on heating, partially or completely vaporizes. The preferred cooling fluids are liquids. Suitable liquids are Dowtherm, Aroclors, etc., and water.

The preferred cooling liquid is water. In the present embodiment the cooling apparatus is used to produce high temperature, high pressure steam. The heat energy recovered in cooling can be used for power generation or heating service.

It is found that when cracking is carried out at short residence time and at high temperature and at a relatively low hydrocarbon partial pressure, the yield of olefins, and ethylene in particular, is enhanced. With the increase in yields of ethylene and other unsaturated compounds such as acetylenes and butadienes the yields of saturated compounds such as hydrogen, methane and ethane are decreased.

In the process of the present invention, the reactant temperature is made to rise continuously from the inlet of the reaction coil, i.e., in the radiant section of the furnace, to the outlet of the reaction coil. The temperature rise is more rapid at first while the reactants are being heated to the temperature level at which the reaction rates become substantial, and then at a lower rate of increase throughout the remainder of the reaction zone due to the endothermic nature of the cracking reactions.

The reactant temperature at the inlet of the reaction zone can be about 1100° to 1200° F. and rises to a value at the outlet of about 1500° to 1650° F. The residence time referred to herein is the residence time of the reactants in the reaction zone.

The process of the present invention can be carried out to obtain selective chemical conversions of specific hydrocarbons. The hydrocarbon feed can be in the liquid or vapor phase or mixed liquid vapor phase. The hydrocarbon is normally in vapor phase in the reaction zone. The feed will generally be preheated in the preheat zone from about ambient temperature, e.g., 70 to 80° F. to a temperature below that at which significant reaction takes place, e.g., 1100° to 1200° F. During the preheat step, depending on the boiling range of the feed, the feed may be partially or completely vaporized. In the processes where steam is used, steam is added to the feed prior to the feed being introduced to the reaction zone. For example, the steam can be added at points in the preheat section at which the feed is 70 to 90% vaporized. The steam when added in this manner acts to completely vaporize the feed by reducing the hydrocarbon partial pressure. The steam also functions to maintain low hydrocarbon partial pressure in the reaction zone.

The process has particular application to thermal cracking of petroleum naphtha fractions in a furnace reactor containing a convection preheat section, and a radiant heat reaction section. The inlet temperature to the radiant heat section will be about 1100° to 1200° F. and the outlet temperature from the radiant heat section will be about 1500 to 1650° F. The feed rate is such that the mass velocity of the feed through the radiant coils in the furnace can be 15 to 35 lbs. per second, per square foot of cross sectional area, preferably, 18 to 26 lbs. per second, per square foot, and specifically 20 to 24 lbs. per second, per square foot of cross sectional area of the reaction tube. The mass velocity when steam is used is based on the total flow of steam and hydrocarbons.

In thermal hydrocarbon cracking processes, at any specified conditions of hydrocarbon charge rate and partial pressure, as the temperature is increased conditions are reached whereby coking of the conduits and/or fouling of the equipment downstream of the furnace occurs thus requiring frequent decoking of the equipment. With the short residence time, high temperature process of the present invention, higher conversion can be achieved than with conventional, longer time, lower temperature processes, with the result that the yields of ethylene and other unsaturates can be enhanced. The maximum yield of ethylene is increased by increasing the conversion level and by improving selectivity to ethylene.

Further, selectivity and yield are enhanced by maintaining a relatively low partial pressure of hydrocarbon in the conversion or reaction zone. The partial pressure in the reaction zone is determined by the total pressure at the furnace outlet, the quantity of dilution steam relative to that of the hydrocarbon and the pressure drop in the cracking coil.

For a specific steam to hydrocarbon ratio and a specific total pressure at the coil outlet, the effective average hydrocarbon partial pressure in the reaction zone is lower in a coil which exhibits low pressure drop than in a coil which exhibits high pressure drop.

The present invention provides a process and apparatus which utilize relatively short cracking coils, relatively high mass velocity, and relatively low dilution steam ratio, and still achieve low hydrocarbon partial pressure in the reaction.

Where a hydrocarbon cracking process is to be carried out, for example, in the production of ethylene, the hydrocarbon feed can be diluted with steam at a weight ratio of steam to feed of 0.1 to 2.0, preferably 0.3 to 1.0 and specifically 0.4 to 0.8. The mass velocity is based on the total flow of hydrocarbons and steam.

The residence time of the feed in the radiant section of the cracking coil can be 0.10 to 0.50 second, preferably, 0.15 to 0.40 second and specifically 0.20 to 0.40 second. At the high temperatures used, the cracking reactions take place very rapidly. In order to prevent production of large amounts of undesirable by-products and in order to prevent severe coke deposition, it is necessary to cool rapidly the effluent product gases from the radiant zone exit temperature of 1500° to 1650° F. to a temperature at which the cracking reactions substantially stop. This can be done by rapidly cooling in a suitable heat exchange apparatus by 100 to 600° F. that is from about 1500 to 1650° F. down to about 100 to 140° F. The cooling step is carried out very rapidly after the effluent leaves the radiant section of the furnace in about 1 to 30 milliseconds, preferably in about 5 to 20 milliseconds, and specifically in about 5 to 15 milliseconds. The rapid cooling step is critical in the high temperature, short residence time process for cracking hydrocarbons to produce olefins. It is found that, if the cooling step takes substantially more than about 30 milliseconds, there may be substantial coke deposits in interior passages of the cooling unit and downstream equipment.

The novel furnace of the present invention can be used to provide heat for any purpose for which it is desired to heat a fluid to high temperature, to maintain the fluid at high temperature for short residence time and at relatively high mass velocity. The furnace comprises a radiant heat section containing radiant burners which provide high temperature over the surface to be heated at high average heat flux of 20,000 to 35,000 B.t.u./hr./sq. ft., and preferably at 22,000 to 28,000 B.t.u./hr./sq. ft. This proves a maximum tube temperature of up to about 1950° F. The radiant section of the furnace contains coils or tubes which can have an inlet pressure of 30 to 75 p.s.i.a. and an outlet pressure of 20 to 45 p.s.i.a., and preferably, the inlet pressure can be 40 to 50 p.s.i.a. and the outlet of 25 to 35 p.s.i.a. The pressure drop through the coil is low and can be 10 to 30 p.s.i. and preferably 10 to 20 p.s.i. One of the advantages of the furnace design is that the fluid in the conduits to be heated is maintained at a relatively low pressure during the heating. The hydrocarbon outlet partial pressure can be 5 to 20 p.s.i.a. and preferably 10 to 15 p.s.i.a. A preferred radiant coil inlet pressure is about 40 p.s.i.a. having a preferred outlet pressure of about 25 p.s.i.a. The preferred hydrocarbon partial pressure at the outlet can be about 13 to 14 p.s.i.a. The conduits containing the fluid to be heated can be 60 to 210 ft. in length, each conduit can contain 2 to 8 tubes of 20 to 45 ft. in length connected by 180° bends and the tubes can have an inside diameter of 2–3 inches. Preferably, the conduits are about 90 ft. to 150 ft. in length, are made up of three to five tubes of thirty to forty feet in length connected by 180° bends which form a coil having a plane generally parallel to the furnace walls and burners. In one embodiment of the invention the coils are about 90 ft. in length, and comprise three tubes of about 30 ft. in length connected by two 180° bends. The tubes are preferably about 2 inches in inside diameter.

The furnace can have a single or a double row of tubes and the tubes can be vertically or horizontally disposed in the furnace. A preferred embodiment of the invention, however, utilizes a single row of vertically disposed tubes. In a cracking coil that exhibits high pressure drop, the total pressure in the coil decreases very rapidly in the outlet end of the coil. This results in a partial pressure profile in the coil which passes through a maximum near the coil outlet and in the zone of high conversion, and this maximum hydrocarbon partial pressure is substantially higher than the partial pressure at the outlet of the coil. Thus, in high pressure drop coils, a relatively high hydrocarbon partial pressure occurs in that zone of the coil where low partial pressure is required if maximum selectivity and conversion to olefins are to be obtained.

In accordance with the present invention, by using a coil that exhibits low pressure drop characteristics while operating at the same conditions of steam dilution and coil outlet pressure as the high pressure drop coil, the maximum partial pressure usually occurs at the coil outlet and not in the cracking coil in the zone of high conversion, and in those cases where a maximum does occur in the coil, the maximum partial pressure is not significantly higher than the partial pressure at the coil outlet. To obtain high selectivity to olefins at high conversion a relatively low hydrocarbon partial pressure is required. The total furnace outlet pressure can be 25 to 30 p.s.i.a. With a total furnace outlet pressure of 25 to 30 p.s.i.a., the hydrocarbon partial pressure at the outlet is determined by the amount of dilution steam employed per unit quantity of hydrocarbon and by the molecular weight of the hydrocarbon effluent.

The steam to hydrocarbon weight ratio can be 0.3 to 1.0 and can preferably be about 0.5. In a process for cracking naphtha to obtain ethylene at a total outlet pressure of about 25 p.s.i.a. and at a steam to hydrocarbon weight ratio of 0.5, the hydrocarbon partial pressure at the coil outlet will be about 14.0 p.s.i.a.

With the high temperature and short residence time used in the present invention it is necessary to cool rapidly the furnace effluent sufficiently below the reaction temperature to stop substantially the reaction. If this is not done the reaction continues after the effluent has left the reaction zone and can result in degradation of product, reduction of ethylene yield, and increased production of polynuclear aromatics and/or other compounds of low volatility. Such products tend to cause deposition of coke on the walls of the downstream equipment. At 1600° F. reaction rates are so high that the residence time in a quench zone at times as short as 50 milliseconds results in a significant amount of reaction taking place. It is, therefore, important to quench the effluent immediately and very rapidly after it leaves the furnace to a temperature at which substantially no deleterious reaction takes place, e.g., below 1100 to 1400° F.

The apparatus comprises a means whereby the hot furnace effluent is cooled in an annular passage, either or both of the surfaces comprising the annular passage being a heat transfer surface. This cooling apparatus is particularly adapted to rapid quench of hot gas with a small decrease, substantially no change, or a small increase in the pressure of the fluid being cooled while generating high pressure steam economically.

The cooling apparatus or quenching unit of the present invention provides rapid cooling for hot fluids by direct heat exchange on cooling surfaces. The heat exchanger can be used to cool liquids or gases and/or for heat recovery and generation of steam. In order to simplify the discussion of the conditions of using the apparatus, the apparatus will be discussed with reference to cooling a hot gaseous hydrocarbon effluent from a cracking furnace using high pressure water as the coolant. The inlet gas temperature to the quench unit can be about 1350 to 1650° F. and is rapidly cooled by 100 to 600° F. The hot gases are fed to the quench unit as a velocity of 350 to 1000 ft./sec., and preferably at 500 to 900 ft./sec. The heat flux at the inlet to the cooling apparatus can be as high as 80,000 B.t.u./hr./sq. ft. and the cooling apparatus can have an average heat flux of about 40,000 B.t.u/hr./sq. ft. In the operation of the unit, at the pressures described below, about 10 to 15 lbs. of water are circulated for each pound of steam produced. The design and operation of the unit can provide that there be substantially no decrease in pressure between the hot gas inlet and the quenched gas outlet. The pressure decrease of the fluid to be cooled can be kept down to 3 p.s.i. and preferably less than 1 p.s.i. The water is introduced to the unit at a pressure of 1000 to 2000 p.s.i.a. and at a temperature of about 540° to about 635° F. and preferably, the coolant water is introduced at a pressure of 1500 to 1800 p.s.i.a. and at a temperature of about 595° to 620° F. In the embodiment of the invention where the coolant circulation is provided by thermosiphon effect, the circulation rate can be self-regulating within design limits and automatically adjusts for variations in cooling service required.

When cooling high temperature hydrocarbon streams which contain some relatively high boiling constituents, it is necessary to maintain the cooling surfaces at a temperature high enough to prevent condensation and deposition of the high boiling constituents on the cooling surfaces, but it is also necessary to maintain the cooling surfaces cold enough to carry out the rapid cooling of the effluent stream that is required.

Figure 2:
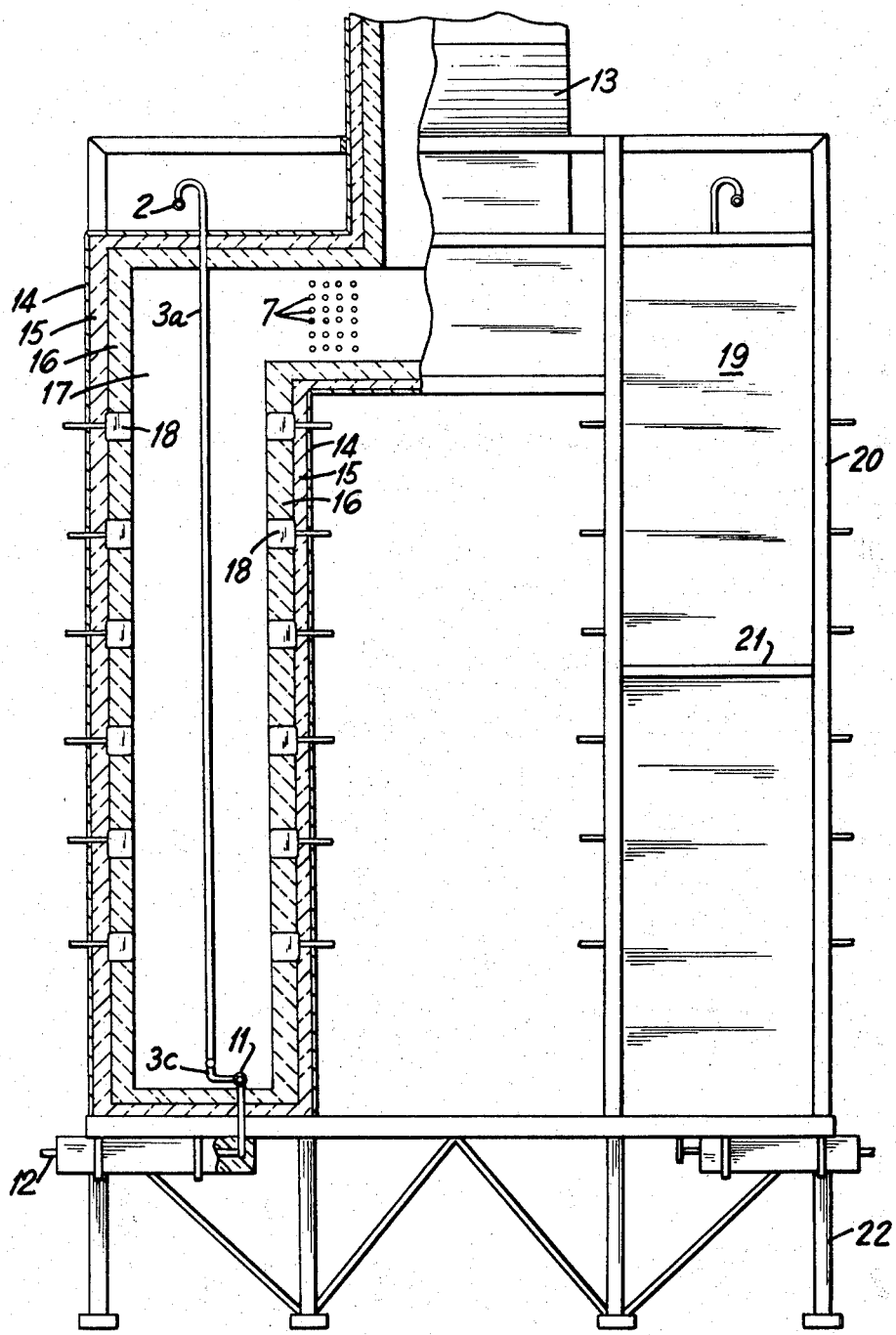
FIGURE 2 is an end elevation of the furnace with part of the end wall broken away to show a section through A—A.

The furnace embodiment of the invention will be discussed with reference to FIGURES 1 and 2 of the drawings. The figures of the drawings show one form of heating apparatus for the heat treatment of fluid materials.

The apparatus comprises an enclosure having an outer shell 14 and an inner wall 16 defining a heating chamber 17 and having tubes or pipes 3–6 forming a coil assembly located centrally within said chamber 17. These tubes receive the preheated fluid material to be reacted and form coils which define paths through which the fluid flows.

The furnace wall is made up of the outer shell 14 intermediate block insulation 15 and an inner wall comprised of fire brick 16. The inner wall 16 of chamber 17 comprises a refractory material capable of withstanding the heat to which it may be subjected in in any particular installation. Chamber 17 is substantially closed except for passage 13 at its top which forms an outlet for the combustion products leaving the chamber. Passage 13 contains the preheat tubes 7 which communicate with tubes 3–6. Tubes 7 comprise the convection heating section of the furnace and recover heat that may otherwise be wasted. The fluid material to be heated is introduced into line 1, which is in communication with tubes 7, flows through preheat tubes 7, i.e., the convection preheat section, and to the radiant section feed header 2 and flows into the radiant section.

The fluid material is thus preheated to a temperature just below that which it is desired to treat or react the material.

Figure 7:
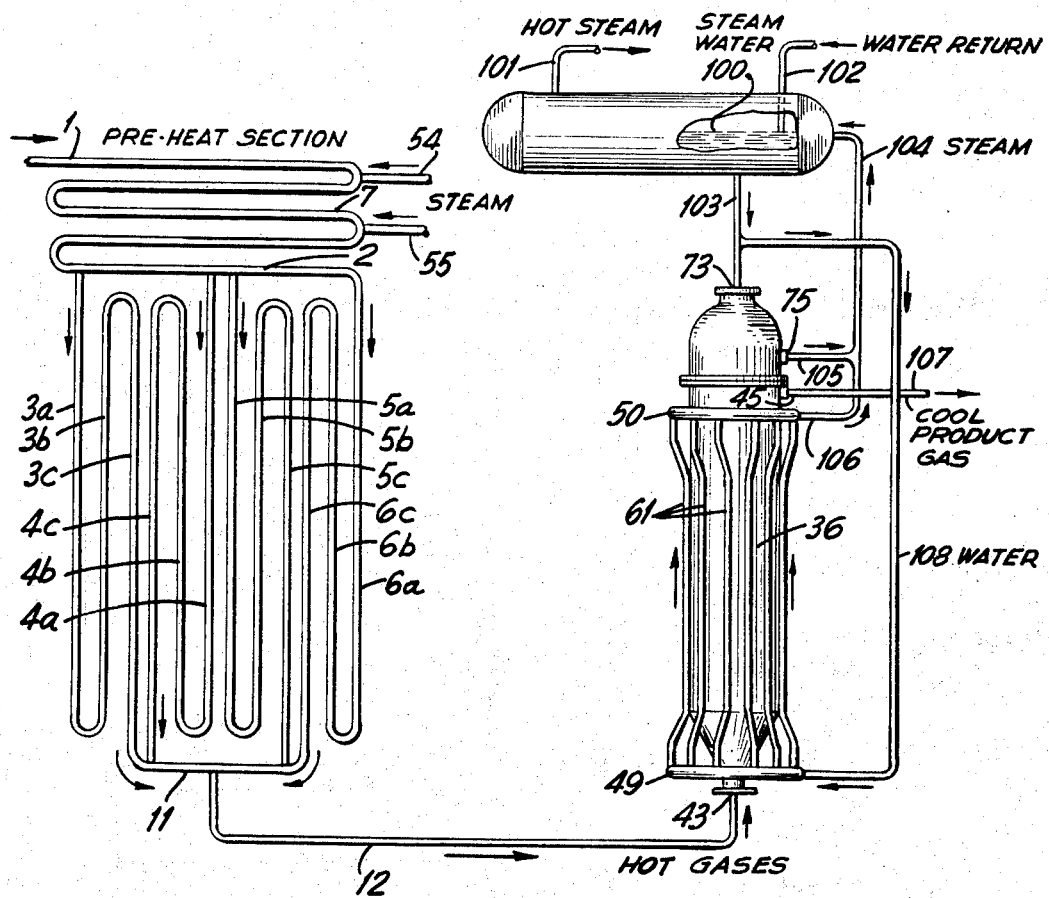
FIGURE 7 is a schematic flow diagram showing an embodiment of the overall process and the flow of the various process streams.

In hydrocarbon cracking processes steam can be introduced into tubes 7 through lines 54 and/or 55, see FIG. 7, to help vaporize the feed and to control the hydrocarbon partial pressure in the radiant section.

A multiplicity of radiant burners 18 are located in the opposed side walls of chamber 17 and these burners are arranged in such a manner that radiant heat therefrom is radiated to tubes 3–6.

Burners 18 may be supplied in a conventional manner with natural gas or other combustible gas or finely dispersed fuels through headers, manifolds, or individual pipes leading to each burner, which are not shown.

The metal case or shell 14 forms the outer wall of the furnace and the complete structure is built on legs 22. Structural members 20 and 21 comprise steel framework which support the furnace walls.

The particular type of radiant heat burner and the details associated therewith need not be described since they are well-known and are conventional in the art. Any type of radiant heat burner can be used which provides substantially all of the heat by radiation.

The tubes 3a, b, and c, for example, are disposed vertically within the fire box 17. The tubes are about 28 feet in length and are connected in series by two 180° bends to form a single serpentine coil of about 90 feet in total length. In this embodiment, the inside diameter of the tubes can be two inches. The coils are supported at the top and guided at the bottom of the furnace in a conventional manner. The inlet tubes of each coil assembly, that is, 3a, 4a, 5a and 6a are connected to a feed inlet header 2 at the top of the fire box and the outlet tubes 3c, 4c, 5c and 6c are connected to a product outlet header 11 at the bottom of the furnace. The plane of the coil assembly is generally parallel to and equidistant from two facing sides of the fire box in which sides are located the burners 18, see FIG. 2.

Four coils, e.g., 3, 4, 5 and 6 can be connected to one upper header 2 and one lower header 11 and can comprise a coil assembly. Depending on the amount of product desired, a particular furnace can be designed and can contain as many of such coil assemblies as necessary in a single furnace to obtain the desired capacity for the furnace. Also, a coil assembly can contain less than or more than four coils. A furnace can contain from 1 to 20 coil assemblies, and preferably from 4 to 10 coil assemblies.

Each coil assembly can be provided with its own convection preheat coil and its own quenching apparatus for the rapid quenching of the effluent product gases. The combustion gases from convection section pass to a stack which can be common to one or more convection sections. The quenching device or unit must be close coupled to the radiant section coil outlet headers to provide for rapid reduction in temperature of the effluent gas from the radiant section.

Line 12 is in communication with the cooling device and provides a means by which the hot effluent gases from the radiant section of the furnace are conveyed to the cooling device.

One embodiment of the present invention comprises the novel quenching device or cooling apparatus. The quenching device is placed in close proximity to the outlet header of the hot effluent stream to be cooled and is designed to rapidly reduce the temperature of the hot effluent stream by a specified amount. The quenching device represents an important part of the overall process. However, the inventive concept embodiment in the quenching device can find ready application for cooling other process streams and/or to provide for heat recovery.

An embodiment of the cooling apparatus will be described with reference to FIGURES 3 and 4 of the drawings. Referring to FIGURE 3 of the drawings, the cooling device can comprise three concentric cylinders or pipes which are vertically disposed, the outer cylinder of which is provided with a multiplicity of equally spaced tubes. The hot effluent gases are introduced into the coolant apparatus and rapidly cooled by direct heat exchange by contact with two cooling surfaces.

The novel cooling apparatus of the present invention provides a means for cooling rapidly the furnace effluent sufficiently to stop substantially the reactions so that the gas can be conducted to a conventional multitube heat recovery exchanger. The apparatus is a heat exchanger in which high pressure steam is generated. Also, the inlet end of the quencher is designed to lower gradually the velocity of the furnace effluent stream so that the velocity head or kinetic energy is converted to static pressure. The pressure recovery realized can partially, entirely, or more than offset the friction pressure drop through the device depending upon the specific dimensions of the apparatus and the conditions under which it is operated. Rapid cooling of the gas is effected by passing the gas through an annular passage which is cooled.

The central concentric pipe 32 has an inlet 73 at its upper end. The second concentric pipe 34 at its upper end just short of inlet 73 curves inward and abuts and terminates at the wall of central pipe 32. The outer wall of pipe 32 and the inner wall of pipe 34 form annular space 33. Spacer 48 maintains pipe 32 equidistant from the inner wall of pipe 34. Pipe 34 at its lower end forms a rounded chamber terminating in rounded end member 37. The third concentric pipe 36 extends about the length of the apparatus and terminates short of the top of pipe 34. Above the point at which pipe 36 terminates, conduit 74 is in communication with annular space 33 through outlet opening 75. The inner wall of pipe 36 and the outer wall of pipe 34 form the second annular chamber 35. Near the top of annular passage 35 there is provided baffle ring 46 which prevents stagnant product gases from accumulating in the upper end of the annular chamber. Also near the top of annular chamber 35 there is provided connecting means 44 which is in communication with annular passage 35 through outlet opening 45. Baffle ring 46 and spacers 47 maintain concentric pipe 34 in the center of annular chamber 35.

The outer wall of concentric pipe 36 can be provided with a multiplicity of equally spaced tubes 61 which tubes are connected to and are in close contact with outer wall 36. These tubes run the approximate length of outer wall 36 from about the bottommost portion of wall 36 up to conduit 44. Tubes 61 at the upper and lower ends flare outward by curved portions 60 and 62, respectively and are in communication with torus 50 at their upper end and torus 49 at their lower end. Torus 49 has a connecting conduit 64 through which coolant fluid passes through inlet 63 into the torus 49 and flows upwardly through tubes 61. Tubes 61 are in communication with upper torus 50 and the cooling fluid flows out of torus 50 through outlet 66 and conduit 65.

An important feature of the cooling apparatus is nose cone 38 which is attached to end member 37 and converges downwardly to form the nose cone. Concentric pipe 36 at a position proximate to the end of the straight portion of concentric pipe 34 tapers inwardly in the general direction of the nose cone 38 to form inlet opening 43. The cross sectional area of inlet 43 is such that the annular passage 40 gradually increases in cross sectional area from inlet 43 to the annular space formed by the walls of pipes 34 and 36.

The cooling apparatus can be designed and sized to accommodate any desired cooling service. Suitable apparatus for use in the present invention can have an overall length of the cooling apparatus from coolant inlet 73 to hot effluent gas inlet 43 of 20 to 24 feet. The inside diameter of the third concentric pipe can be 8 to 10 inches. Tubes 61 can be about one to two inches in inside diameter. The inside diameter of toruses 49 and 50 can be about 3 to 4 inches. The cross sectional area of central chamber formed by pipe 32 can be seven square inches. The length of the central chamber can be 18 to 20 feet. The cross sectional area of the first annular chamber 33 can be about twelve square inches and can have a length of about 18 to 20 feet. The cross sectional area of the second annular chamber 35 can be about 20 square inches and the chamber can have a length of about 16–18 feet, excluding the inlet section. The cross sectional area of gas inlet 43 can be about 12 to 13 square inches, gradually increasing in cross sectional area to about 19 to 20 square inches in the straight portion of pipe 34. Tapered nose cone 38 can have an angle at its apex of about 28 to 30°. The total cross sectional area of tubes 61 can be about 10–11 square inches. The total coolant flow through tubes 61 and first annular passage 33 can be about 10 times the flow of hot effluent gases based on weight.

Hot gases at a velocity of 700 to 800 ft./sec. enter the cooling apparatus through inlet 43 and pass into second annular chamber 35 where they are slowed to about 400 to 500 ft./sec. and pass out of the apparatus at the end of the chamber through outlet 45. The coolant water is introduced through inlet 73 and flows downward in the central chamber of concentric pipe 32 and a mixture of water and steam flows upward in first annular passage 33 and passes out near the top of the first annular passage through outlet opening 75. Coolant water enters the bottom torus 49 through inlet 63 and flows upward in tubes 61 providing direct contact cooling for the hot furnace effluent gases at the inner wall surface of pipe 36. The inner surface of pipe 36 and the outer surface of pipe 34 provide the two cooling surfaces for the hot gas.

The mixture of steam and water move upward in tubes 61 into torus 50 and through outlet 66.

The inlet diffuser or nose cone 38 provides for gradual increase in cross sectional area of the gases entering through inlet 43 which gradually increases the pressure of the hot gases as the gas velocity is reduced. The diffuser cone 38 insures uniform gas distribution between cooling surfaces 36 and 34 without the production of eddy currents in the gas flow. In accordance with the present invention, the pressure increase in the gas caused by the gradual increase in cross sectional area in the inlet compensates for a substantial portion of the pressure loss in the gas due to friction. The cooled outlet gas pressure will be about the same as the hot inlet gas pressure. Passage 40 is sized to provide the gradual increase in cross sectional area through which the hot gases flow. The gradual increase is provided by the tapered shape of nose cone 38 and the converging wall 39 of pipe 36.

The gradual increase in cross sectional area provides a gradual decrease in gas velocity which is accompanied by an increase in gas pressure to conserve total energy.

The angle of nose cone 28 and the entering pipe 39 are selected so that the increase in cross sectional area of the annular space formed between cone 38 and pipe 39 per unit length is equal to the increase in cross sectional area per unit length of a conical pipe having an angle of divergence of 4 to 7°, e.g., 5°. The angle of the cone 38 and the extent to which converging wall 39 corresponds to the angle of cone 38 provide the necessary gradual increase in cross sectional area. The nose cone angle can be 25 degrees to 30 degrees. The angle of converging wall 39 if taken to an apex can be 20 to 25 degrees. The length of cone 38 can be 8 to 12 inches. The cooling chamber that is the second annular chamber 35 has the same cross sectional area throughout its length.

FIGURE 4 shows a cross section of the cooling apparatus taken through line B—B of FIGURE 3. FIGURE 4 shows an end section of tubes 61 and the manner in which they are connected by welds 70 to the outer wall of concentric pipe 36. A suitable heat transfer material 71 can be used to fill the space between tubes 61 and to improve the heat transfer between the hot gases and coolant.

Another embodiment of the cooling apparatus is illustrated by FIGURES 5 and 6 of the drawings. In this embodiment cooling of the hot gases is provided primarily by direct contact with the outer wall of concentric pipe 34. In order to improve the heat transfer between pipe 34 and the hot gases, pipe 34 can contain a multiplicity of cooling fins 56 which project into the hot gases in annular space 35.

A preferred embodiment of the process of the present invention using the reactor furnace and cooling unit will be described with reference to FIGURE 7 of the drawings. A petroleum naphtha fraction boiling in the range of 90 to 375° F. is fed through line 1 into convection preheat section 7 wherein it is heated from about ambient temperature to a temperature of about 1000° to 1100° F. Steam, at a ratio of steam to hydrocarbon of about 0.4 to 0.8 by weight, is introduced into preheat section 7 at a point where the naphtha feed is approximately 90% vaporized. The preheated hydrocarbon and steam mixture at about 1000° to 1100° F. is then fed into the inlets of coils 3–6. The feed is heated in the coils from about 1000° to 1100° F. to a coil outlet temperature of about 1650° F. Under the recited conditions the hydrocarbon partial pressure at the coil outlet is about 12 to 14 p.s.i.a. The residence time of the fluid in the radiant section of the furnace is about 0.20 to 0.25 second. The mass velocity of the hydrocarbon and steam in the coils is about 18 to 26 pounds per second, per square foot of cross sectional area of the coil. The radiant coil inlet pressure is about 45 p.s.i.a. and the coil outlet pressure of the effluent gases is about 25 p.s.i.a. The hot effluent gases are fed through line 12 to the cooling apparatus at a gas velocity of about 800 ft./sec. The hot gases are introduced into the cooler through inlet 43 at a temperature of about 1650° F. The cooled gases are withdrawn from the cooler through outlet 45 which is in communication with line 107. The gases are cooled rapidly in about 10–20 milliseconds to a temperature of about 1200 to 1400° F. and are conveyed to a conventional cooling means for further cooling and to a conventional olefin separation plant for separation and recovery of ethylene. The gas pressure in line 107 is about 25 p.s.i.a.

FIGURE 7 of the drawing illustrates the thermosiphon cooling embodiment of the present invention. Coolant water from steam drum 100 is introduced through line 103 and line 108 at a temperature of about 600° F. and a pressure of about 1600 p.s.i.a. The coolant flows through line 108 into torus 49 and upward in tubes 61 in which tubes it is partially converted to steam. The steam and water mixture flows into torus 50 and through lines 106 and 104 back to steam drum 100. A steam and water mixture from first annular passage 33 (see FIGURE 3) flows out of outlet 75 into line 105 and 104 and back to steam drum 100. The water being more dense than the mixture of steam and water sets up a thermosiphon flow of coolant water through the cooling apparatus. Within design limits the cooling apparatus is self-regulating and the higher the temperature and flow rate of gases into the cooling unit the faster will be the coolant liquid circulation rate.

Saturated steam at a temperature of about 600° F. and a pressure of about 1600 p.s.i.a. can be withdrawn from steam drum 100 through line 101 and the heat energy recovered. Boiler feed water is fed to steam drum 100 through line 102.

The process and apparatus of the present invention can be used in other known processes. The furnace and process of using the furnace has many obvious applications for heating fluids and or carrying out specific chemical reactions. The cooling apparatus similarly has many obvious uses for cooling process streams, heat exchange, and other uses that will appear obvious to those skilled in the art.

The invention will be better understood with reference to the following examples which are carried out using the apparatus and process illustrated in FIGURES 1–4 and 7 of the drawings.

EXAMPLE 1

A petroleum naphtha fraction derived from Kuwait crude oil and having the following characteristics is used to illustrate the invention.

| | |
|---|---|
| Specific gravity | 0.724 |
| ASTM distillation, ° F.: | |
| Initial boiling point | 110 |
| 50 vol. percent distilled | 249 |
| Final boiling point | 353 |
| Composition by component type, liquid vol.: | |
| Paraffins | 72.0 |
| Olefins | 0.4 |
| Naphthenes | 19.0 |
| Aromatics | 8.6 |

Steam is mixed with hydrocarbon feed at a weight ratio of steam to hydrocarbon of 0.7. The mixture is heated in the preheat section to about 1100° F. and introduced into the cracking coils at an inlet pressure of about 40 p.s.i.a. About 1015 pounds of hydrocarbon feed per hour, per coil or 4060 pounds per hour, per assembly of four coils are fed to the furnace. In the radiant section of the furnace, the steam and hydrocarbon mixture is gradually heated from about 1100° F. to a coil outlet temperature of about 1625° F. The feed is thermally cracked in the coil at a residence time of 0.23 second. The feed undergoes thermal cracking under conditions of high severity and low hydrocarbon partial pressure to produce ethylene in high yield. Based on a single pass about 30 percent ethylene yield by weight is obtained. The coil outlet temperature of the effluent gases is about 1625° F. at an outlet pressure of about 25 p.s.i.a. and hydrocarbon partial pressure of about 12 p.s.i.a. The effluent gases are rapidly cooled from about 1625° F. to about 1200° F. in less than about 15 milliseconds. The quencher outlet pressure of the cooled gas is about 24 p.s.i.a. Coolant water having an inlet temperature of about 600° F. and a pressure of about 1600 p.s.i.a. is circulated at a ratio of coolant to hot gas of about 10 to 1 by weight. The temperature of the steam-water mixture leaving the quencher is about 600° F. and about 1 pound of steam is formed for each 15 pounds of water circulated. The product distribution of the effluent gases is as follows:

| Furnace effluent hydrocarbons, wt. percent of feed: | |
|---|---|
| Hydrogen | 1.1 |
| Methane | 14.6 |
| Acetylene | 1.0 |
| Ethylene | 29.5 |
| Ethane | 3.0 |
| Methyl acetylene and propadiene | 1.0 |
| Propylene | 13.5 |
| Propane | 0.3 |
| 1,3-butadiene | 4.3 |
| Butenes | 3.7 |
| $C_5$ and heavier | 28.0 |

The above example illustrates the use of the present invention to produce ethylene from a naphtha feed containing a substantial amount of paraffins.

EXAMPLE 2

In another example of the invention a naphtha fraction derived from a Nigerian crude oil is thermally cracked to produce olefins. The fraction has the following characteristics.

| | |
|---|---|
| Specific gravity | 0.74 |
| ASTM distillation,° F.: | |
| Initial boiling point | 115 |
| 50 vol. percent distilled | 239 |
| Final boiling point | 352 |
| Composition by component type, liquid vol. percent: | |
| Paraffins | 46.5 |
| Olefins | 0.1 |
| Napthenes | 41.5 |
| Aromatics | 11.9 |

Steam is mixed with the hydrocarbon feed at a weight ratio of steam to hydrocarbon of 0.5. The mixture is heated in the preheat section to about 1100° F. and introduced into the cracking coils at an inlet pressure of about 43 p.s.i.a. About 1150 pounds of hydrocarbon feed per hour, per coil or about 4600 pounds per hour per assembly of four coils are fed to the furnace. In the radiant section of the furnace, the steam and hydrocarbon mixture is gradually heated from about 1100° F. to a coil outlet temperature of about 1645° F. The feed is thermally cracked in the coil at a residence time of 0.25 second. The feed undergoes thermal cracking under their conditions of high severity and low hydrocarbon partial pressure to produce ethylene in high yield. Based on a single pass about 24% yield by weight is obtained. The coil outlet temperature of the effluent gases is about 1645° F. at an outlet pressure of about 25 p.s.i.a. and a hydrocarbon partial pressure of about 14 p.s.i.a. The effluent gases are rapidly cooled from a temperature of about 1645° F. to about 1200° F. in less than about 15 milliseconds. The quencher outlet pressure of the cooled gas is about 24 p.s.i.a.

The operating conditions of the quencher unit are about the same as in Example I.

The product distribution of the effluent gases is as follows:

Furnace effluent hydrocarbons, wt. percent of feed:
    Hydrogen ------------------------------- 1.0
    Methane -------------------------------- 13.5
    Acetylene ------------------------------ 0.9
    Ethylene ------------------------------- 24.0
    Ethane --------------------------------- 2.5
    Methyl acetylene and propadiene -------- 1.0
    Propylene ------------------------------ 12.0
    Propane -------------------------------- 0.2
    1,3-butadiene -------------------------- 4.0
    Butenes -------------------------------- 3.0
    $C_5$ and heavier ---------------------- 37.9

This example illustrates the conversion and product distribution obtained from a naphtha feed which contains a relatively large amount of naphthenes as compared to the naphtha feed of Example 1 which contains a relatively large amount of paraffins.

The cracking furnace used to illustrate the above examples contains radiant section coils having an inside diameter of about two inches. Each coil comprises three tubes of about equal length joined by two 180° bends to form a coil of about 90 feet in length.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. An apparatus for the continuous heating of fluid materials comprising walls of refractory material defining a chamber having an outlet passage at the top thereof, said chamber containing disposed therein heating means for said fluid including a plurality of conduits about 60 to 210 feet in length and having an inside diameter of about 2 to 3 inches, said conduits being disposed in said chamber about equal distance between walls of said chamber, and the walls of said chamber containing a plurality of radiant heat burners, said radiant burners being sufficient to provide an average heat absorption rate of 20,000 to 35,000 B.t.u./hr./sq. ft. of conduit surface and a fluid outlet temperature of 1500 to 1650° F.

2. The apparatus of claim 1 wherein each conduit comprises 2 to 8 tubes of about 20 to 45 feet in length connected by 180° bends.

3. The apparatus of claim 2 wherein each conduit is about 90 to 150 feet in length.

4. The apparatus of claim 1 wherein each conduit is about 90 feet in length, has an inside diameter of about 2 inches and comprises three tubes about 30 feet in length connected by 180° bends.

5. The apparatus of claim 1 wherein each conduit is about 210 feet in length and has an inside diameter of about 3 inches.

6. The apparatus of claim 1 wherein each conduit is about 120 feet in length, has an inside diameter of about 2.5 inches and comprises three tubes of about 40 feet in length.

7. The apparatus of claim 1 wherein each conduit is about 150 feet in length, has an inside diameter of about 3.0 inches and comprises five tubes of about 30 feet in length.

8. An apparatus, for the continuous heating of fluids, comprising walls of refractory material defining a rectangular chamber, said chamber having an outlet passage at the top thereof, said chamber having disposed therein heating means for said fluid including a plurality of coils adapted for the passage of said fluids, each of said coils being about 90 to 150 feet in length and having an inside diameter of about 2 to 3 inches, said coils being vertically disposed in said chamber about equidistant from said walls, said walls containing a plurality of radiant heat burners capable of providing high intensity heat to said coils at an average heat absorption rate of 20,000 to 35,000 B.t.u./hr./sq. ft. of conduit surface and at a fluid outlet temperature of 1500° to 1650° F., said coils having an inlet means for said fluids to be heated and an outlet means for said heated fluids.

9. The apparatus of claim 8 wherein at least two of said coils are joined at their respective inlets by an inlet header and at their outlets by an outlet header to form a coil assembly.

10. The apparatus of claim 9 wherein four coils are joined by an inlet header common to said coil inlets and by an outlet header common to said coil outlets to form a coil assembly.

11. The apparatus of claim 9 wherein said chamber contains 1 to 20 coil assemblies.

12. The apparatus of claim 11 wherein said chamber contains 4 to 10 coil assemblies.

13. The apparatus of claim 8 wherein said coils comprise 3 to 5 tubes of about 30 to 40 feet in length connected by 180° bends.

14. A process for the continuous heating of fluids which comprises passing said fluids in a continuous stream through conduits, the pressure of said fluids decreasing by about 10 to 30 p.s.i. while said fluids pass through said conduits, said fluids having a mass velocity of 15 to 35 pounds, per second, per square foot of cross sectional area, and a residence time in said conduits of 0.10 to 0.50 second.

15. The process of claim 14 wherein said conduits are subjected to an average heat flux of 20,000 to 35,000 B.t.u./hr./sq. ft.

16. The process of claim 15 wherein said fluids are heated to a temperature of 1500° to 1650° F.

17. A process for the continuous heating of fluids which comprises passing said fluids in a continuous stream through conduits, the pressure of said fluids decreasing by about 10 to 15 p.s.i. while said fluids flow through said conduits, said fluids having a mass velocity of about 18 to 26 pounds, per second, per square foot of cross sectional area, and a residence time of 0.15 to 0.40 second.

18. The process of claim 17 wherein said conduits are subjected to an average heat flux of 22,000 to 28,000 B.t.u./hr./sq. ft.

19. The process of claim 17 wherein said fluids are heated to an outlet temperature of 1600° to 1650° F.

20. The apparatus of claim 8 wherein said coils are arranged in a double row.

21. The apparatus of claim 8 wherein said coils are arranged in a single row.

References Cited

UNITED STATES PATENTS

| | | | |
|---|---|---|---|
| 2,029,291 | 2/1936 | Alther | 122—356 |
| 2,837,065 | 6/1958 | Throckmorton et al. | 122—356 |
| 2,917,564 | 12/1959 | Pollock | 196—116 X |
| 2,934,475 | 4/1960 | Dwyer et al. | 196—116 |
| 3,274,978 | 9/1966 | Palchik et al. | 122—356 |

CHARLES J. MYHRE, *Primary Examiner.*